March 19, 1935.
P. M. HALL
1,994,701
WELDING APPARATUS
Filed Oct. 6, 1932
2 Sheets-Sheet 1
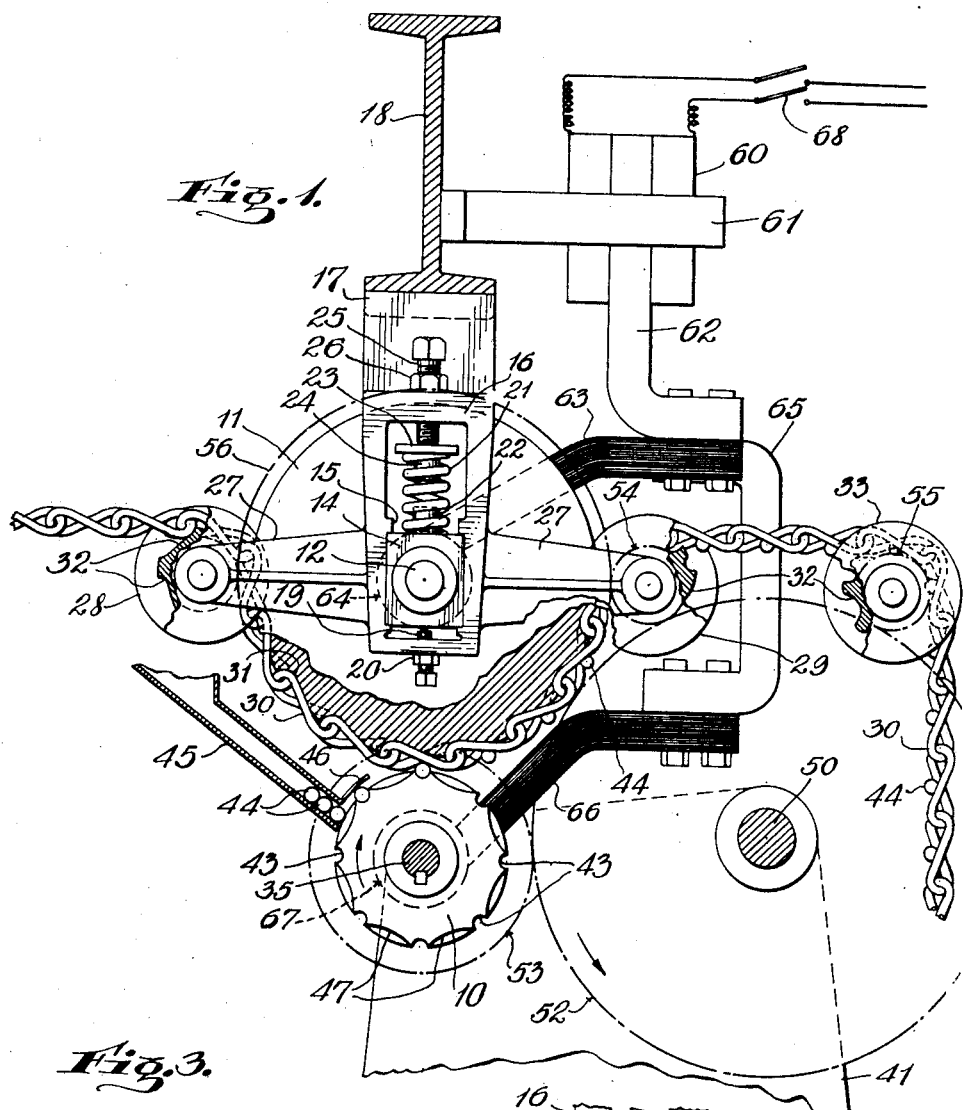
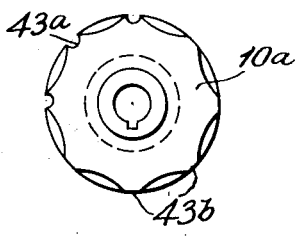
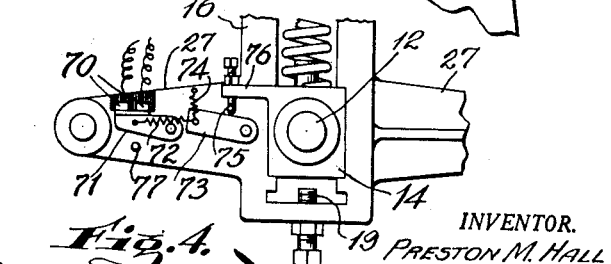
INVENTOR.
PRESTON M. HALL
BY
Frederick P. Duncan
ATTORNEY March 19, 1935.  P. M. HALL  1,994,701
WELDING APPARATUS
Filed Oct. 6, 1932  2 Sheets-Sheet 2
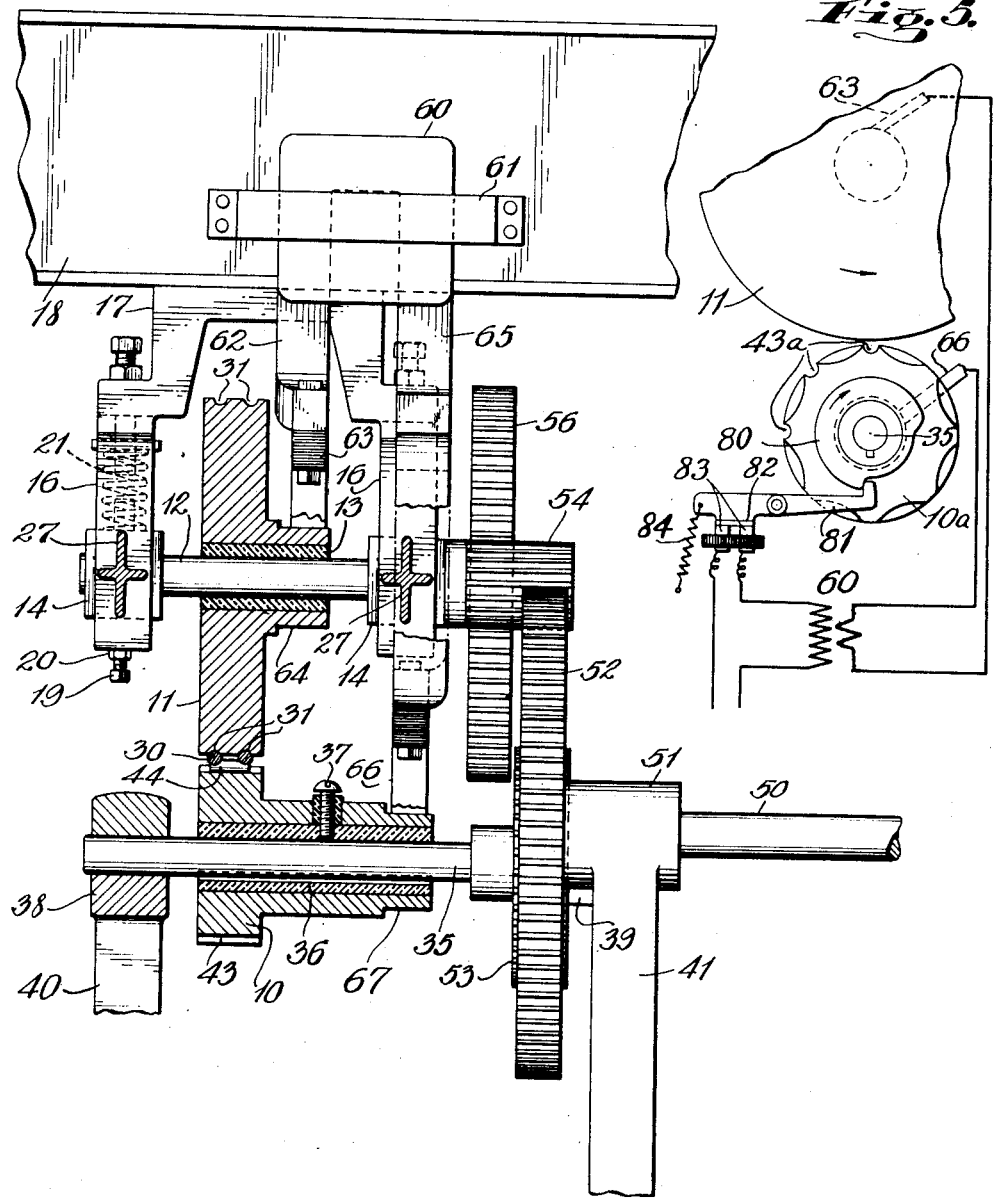
INVENTOR.
PRESTON M. HALL
BY
Frederick S. Duncan ATTORNEY Patented Mar. 19, 1935

1,994,701

UNITED STATES PATENT OFFICE 1,994,701

WELDING APPARATUS

Preston M. Hall, Worcester, Mass., assignor to American Chain Company, Inc., New York, N. Y., a corporation of New York Application October 6, 1932, Serial No. 636,453

8 Claims. (Cl. 219—4)

The present invention relates to welding processes and apparatus of the general class known as electric resistance welding, and it has to do more specifically with the welding of reinforcements on chains.

The invention is particularly adapted for welding bars, slugs, or the like to the cross chain elements of tire chains.

An object of the invention is to provide a method and an apparatus which will permit of welding parts on a chain while the latter is in continuous motion.

Another object is to provide a welding machine in which reciprocating parts are eliminated.

A further object of the invention is to provide a pair of rotary electrodes between which the chain is fed, with means for feeding reinforcement members to the chain, the parts being so organized that the members will be welded to the chain links as they come into engagement therewith.

A further object of the invention is to provide for welding reinforcements to selected links of a continuous chain.

A still further object of the invention is to provide for constant and positive feed of the chain through the machine and with corresponding positive feed of the reinforcements, so that the latter will be accurately positioned on the chain links. With these and other objects in view, I shall now describe a preferred form of apparatus with which my improved process may be carried out, and thereafter shall point out the novelty and scope of the invention in the claims.

In the accompanying drawings;

Figure 1 is a view in front elevation, showing essential parts of a machine embodying my invention, certain of the parts being broken away and shown in section;

Fig. 2 is a view of the same in side elevation with portions thereof in section;

Fig. 3 is a view in front elevation of a form of rotary electrode which may be used in the machine when it is desired to apply the reinforcements to selected links of a chain and not to the other links;

Fig. 4 is a detail view in front elevation of certain switch mechanism employed where the application of reinforcements is confined to selected links of the chain; and Fig. 5 is a partly diagrammatic detail view of a cam operated switch which may be used in place of the switch shown in Fig. 4.

As shown in the drawings, the machine comprises a pair of electrodes 10 and 11 which are adapted to run continuously. The lower electrode 10 is journalled in fixed bearings while the upper electrode 11 is capable of slight movement toward and from the lower electrode. The purpose of this will be explained hereinafter.

The upper electrode 11 is fixed upon a shaft 12 but is electrically insulated therefrom by a bushing 13 of electric insulation. The shaft 12 is journalled in boxes 14 which slide in ways 15 formed in slotted depending arms 16 of an inverted U-shape bracket 17. This bracket is fixed to the under side of a beam 18 which forms part of the framework of the machine. Each box 14 normally rests on an adjustable stop 19 which may be in the form of a set screw threaded through the lower end of the arm 16. A lock nut 20 on the set screw serves to hold the stop at the required adjustment. A spring 21 presses each box 14 downward against the stop. Each spring fits over a stud 22 on the box 14 and bears against a thrust plate 23 formed with a lug 24 that fits into the upper end of the spring. A set screw 25 which is threaded through the upper end of the arm 16 bears against the thrust plate and may be adjusted to regulate the pressure of the spring. The lock nut 26 on the set screw serves to hold the latter at the desired adjustment.

Each arm 16 is provided with a pair of oppositely projecting lateral arms 27 and these arms provide bearings for pulleys 28 and 29 disposed respectively on diametrically opposite sides of the rotary electrode 11. These pulleys serve to guide a chain 30 (on which the reinforcements are to be welded) to and from the electrode 11. The latter is formed with sockets 31 in its periphery in which the links of the chain 30 may be seated. The pulleys may also be provided with sockets 32 for the chain links, so that the chain will be held in close engagement with the electrode 11 and will be positively driven by rotation of said electrode. The chain 30 is drawn from a supply (not shown) at the left hand side of the machine as viewed in Fig. 1, and then, passing around under the electrode 11, is led off over the pulley 29 on the right hand side of the electrode. Thence it passes over a sprocket wheel 33 which carries it clear of the machine. From this sprocket wheel the chain may be fed downward by gravity into any suitable receptacle (not shown).

The lower electrode 10 is fixed upon a shaft 35 but is electrically insulated therefrom by a bushing 36. This electrode is preferably removably mounted on the shaft, so that it may be replaced with another when desired, and to this end there is preferably a spline connection between the bushing 36 and the shaft. A set screw 37 electrically insulated from the electrode 10 serves to hold said electrode at the desired adjustment on the shaft 35. The latter is mounted in bearings 38 and 39 formed in brackets 40 and 41 respectively.

The electrode 10 is formed with peripheral sockets 43 which are adapted to receive reinforcement bars 44 from a suitable hopper 45. The latter is inclined at such an angle that the bars will slide by gravity down toward the electrode 10 and will be picked up by said electrode as they drop into the sockets 43. An arcuate guide 46 serves to retain the bars 44 in the sockets until they are carried up substantially to the welding position. Between the sockets 43 the electrode 10 is cut away at each side, as indicated at 47, so as to clear protuberances of the links of the chain 30 carried by the upper electrode 11.

The machine is driven from a main drive shaft 50 mounted in suitable bearings of which one is shown at 51 in the bracket 41. Fixed upon the drive shaft 50 is a main driving gear 52 which meshes with a gear 53 fixed upon the shaft 35 of the lower electrode. The driving gear 52 also meshes with a pair of pinions 54 and 55 respectively which are fixed to the pulley 29 and sprocket 33 respectively. The pinion 54 in turn meshes with a gear 56 fixed upon the shaft 12 of the upper electrode. By reason of this gearing, the two electrodes 10 and 11 and also the pulley 29 and sprocket 33 will be driven positively, while the pulley 28 will also be driven by the pull of the chain 30 passing between said pulley and the electrode 11.

Current is supplied to the electrodes 10 and 11 by a transformer 60. This transformer is supported in a bracket 61 secured to the beam 18. The secondary of this transformer has a lead 62 to which is connected a brush 63. The latter bears upon a finished cylindrical contact surface 64 on the hub of the upper electrode 11. The opposite lead 65 of the secondary transformer carries a brush 66 which bears against a finished cylindrical contact surface 67 on the hub of the lower electrode 10.

The operation of the apparatus is as follows:
The chain 30 to which the reinforcement bars 44 are to be welded, runs continuously over the pulley 28 around the lower half of electrode 11, thence over pulley 29 and sprocket wheel 33. The stops 19 are adjusted so that the links of the chain will just clear the lower electrode 10. Hence, normally, no current will flow across these electrodes. However, a flow takes place as soon as a reinforcement bar 44 is carried by the electrode 10 against a link of the chain 30. The bar 44 projects slightly from the electrode 10 sufficiently to raise the upper electrode off the stops 19. The springs 21 yield to permit such upward movement of the electrode 11; but as the welding current passes through the link and reinforcement bar, from one electrode to the other, the contacting parts of the chain link and bar soften and are partly flattened down. The springs 21 thus force the upper electrode down toward the lower one and maintain welding contact while the chain and reinforcement bar are passing between the electrodes. Obviously, the peripheral speed of the bars and the chain links must be the same and the gearing is properly selected to insure the desired relative rotational speed of the two electrodes. The sockets 32 in the pulley 29 and wheel 33 are of such shape as to receive the reinforce bars 44 which are welded to the chain links.

The simplicity of the machine as described above will be manifest. The electrodes are both positively driven and so are the chain and bars. There are no reciprocating parts but all parts rotate constantly. No switch is necessary in the circuit of the transformer to time the application of current to the welding operations because the energizing current is continuously on and the secondary welding current flows across the electrodes only when said electrodes are bridged by a chain link and reinforcement bar. Of course, the primary circuit of the transformer is provided with a main switch 68 by which it may be disconnected from the source of current supply (not shown) whenever desired. There will be no arcing because as one bar is leaving electrode 43 the next bar carried by said electrode will make contact with the chain and provide a free path for the current.

It is desirable in some instances to provide reinforcements on only certain selected links of a chain, leaving others blank. Ordinarily the cross chain element used in tire chains consists of seven links with the three center links having lugs welded thereon, and the two outer links at each end being left without reinforcement. Such cross chains are commonly made in a continuous length with a removable link connecting the separate cross chain elements. Thus in continuous lengths of chain there will be sets of three links, each provided with reinforcements and five links (including the removable link) intervening between said sets provided with no reinforcements.

In order to weld the reinforcements on three successive links and to omit reinforcements on the next five links, I provide a special electrode 10a (Fig. 3) which may be substituted for the electrode 10 in Fig. 1. It will be observed that the electrode 10 has eight equally spaced notches 43, whereas the electrode 10a has corresponding notches 43a for only three bars, the rest of the electrode being left blank, as indicated at 43b. When the electrode 10a is used in a machine three successive bars will be picked up from the hopper, fed to the chain, and welded fast to three successive chain links, after which the electrode 10a will pass through five-eighths of a turn before it feeds another bar to the chain. In other words the next five links will receive no bars. In order to avoid arcing it is preferable to provide an automatic switch to cut off the welding current when there are no bars in position to be welded. Such a switch is shown in Fig. 4. The switch may be provided in the primary circuit of the transformer or it may operate through a relay to control either the primary or the secondary circuit as will be evident to any one skilled in the art. As illustrated, a pair of switch contacts 70 are mounted on but insulated from one of the arms 27. A pivoted switch arm 71 is movable to bridge said contacts. The switch arm is connected by a spring 72 to the free end of a pivoted actuating arm 73. The arm 73 is normally held in raised position by a spring 74 so that the spring 72 passes above the pivot of arm 71 and presses the latter in bridging engagement with the contacts 70. The arm 73 may be swung downward by a set screw 75 carried by an extension 76 of one of the boxes 14, and when the arm 73 moves downward far enough for the spring 72 to pass below the pivot of switch arm 71, the latter will suddenly snap clear of the contacts 70 and against a stop 77.

The set screw 75 is so adjusted that as long as there is a bar 44 in welding position the arm 73 cannot be swung downward far enough to snap open the switch, even when the electrode 11 sinks slightly due to flattening of the bar, but whenever there is no bar between the electrodes to limit the drop of electrode 11 the switch will be snapped open. When the electrode 11 is raised by the next bar 44, spring 74 will raise arm 73 and thereby cause the switch arm to snap to the closed position shown in Fig. 4. This arrangement not only prevents arcing but saves current because the current is switched off whenever there is no welding to be done.

Instead of depending upon movements of the electrode 11 to turn the welding current off and on I may employ a cam operated switch, such, for example, as shown in Fig. 5. Fixed upon the shaft 35 is a disk cam 80, against which bears one arm of a switch lever 81. The other arm carries a contact plate 82 adapted to bridge a pair of switch contacts 83 in the primary circuit of the transformer 60. A spring 84 urges the switch plate 82 to bridging position and thus keeps the transformer energized while the notches 43a are passing through the welding position, but at all other times the cam 80 keeps the switch open. Here too the switch may be cut into the primary circuit, as shown, or if desired may be cut into the secondary circuit, or if desired may operate through a relay to control either circuit.

While I have described in considerable detail a preferred embodiment of my invention with certain modifications thereof, I wish it to be understood that these embodiments are to be taken as illustrative and not limitative of the invention, and that I reserve the right to make such changes in form, construction, arrangement of parts and mode of operation as may fall within the spirit and scope of the following claims.

I claim:

1. In a machine for welding reinforcements to links of a chain, a pair of rotary electrodes, means for rotating the electrodes in mutually timed relation, one of said electrodes having a peripheral means adapted to engage the chain and positively convey the same, the other electrode being formed with peripheral means adapted to convey the reinforcements positively and bring them respectively into contact with said links, and means for supplying said electrodes with welding current.

2. In a machine for welding reinforcements to links of a chain, a pair of rotary electrodes mounted one above the other, means for rotating the electrodes in mutually timed relation, the upper electrode being adapted to convey said chain between the two electrodes, the lower electrode being adapted to convey reinforcements into engagement with the links respectively, the mounting of the upper electrode permitting movement of said electrode bodily toward and from the lower electrode, an adjustable stop for such movement to prevent the chain from contacting with the lower electrode, and means for supplying welding current to said electrodes.

3. In a machine for welding reinforcements to links of a chain, a pair of rotary electrodes, means for rotating the electrodes in mutually timed relation, one of said electrodes being adapted to convey said chain between the electrodes, the other of said electrodes being adapted to convey the reinforcements and bring them respectively into engagement with said links, a spring urging one electrode toward the other, an adjustable stop to limit the mutual approach of said electrodes, and means for supplying said electrodes with welding current.

4. In a machine for welding reinforcements to links of a chain, a pair of rotary electrodes, means for rotating the electrodes in mutually timed relation, means for supplying welding current to said electrodes, one of said electrodes being adapted to convey said chain between the electrodes, the other of said electrodes being adapted to convey the reinforcements and bring them into engagement with said links respectively, resilient means for causing mutual approach of the electrodes, and means controlled by such approach for cutting off the supply of current whenever there is less than a predetermined spacing between the electrodes.

5. In a machine for welding reinforcements to selected links of a chain, a pair of rotary electrodes, means for rotating the electrodes in mutually timed relation, one of said electrodes being adapted to convey said chain between the electrodes, the other of said electrodes being adapted to convey the reinforcements and bring them into engagement with said selected links respectively, and means for supplying welding current to said electrodes only when selected links are passing between the electrodes.

6. In a machine for welding reinforcements to selected links of a chain, a pair of rotary electrodes, means for rotating the electrodes in mutually timed relation, one of said electrodes being adapted to convey said chain between the electrodes, the other of said electrodes being adapted to convey the reinforcements and bring them into engagement with said selected links respectively, and means for supplying welding current to said electrodes only when there are reinforcements in welding position.

7. In a machine for welding reinforcements to selected links of a chain, a pair of rotary electrodes, means for rotating the electrodes in mutually timed relation, one of the electrodes being formed with means for positively feeding said chain between the two electrodes, the other of the electrodes being formed at predetermined points with peripheral sockets to receive reinforcements and to bring them into engagement with said selected links respectively, means for supplying the electrodes with welding current, a switch for controlling the current, and means for operating the switch in timed relation to the rotation of said electrodes.

8. In a machine for welding reinforcements to selected links of a chain, a pair of rotary electrodes, means for rotating the electrodes in mutually timed relation, one of the electrodes being formed with means for positively feeding the chain between the two electrodes, the other of the electrodes being formed at predetermined points with peripheral sockets to receive reinforcements and to bring them into engagement with said selected links respectively, means for supplying the electrodes with welding current, a switch for controlling the current, a rotary cam for operating the switch, and means for rotating the cam in timed relation to the rotation of said electrodes.

PRESTON M. HALL.